3,178,418
MONOBROMINATION AT THE 11-POSITION OF HECOGENIN AND 3-LOWER ALKANOYL ESTERS THEREOF
Gordon Hanley Phillipps, Greenford, Frances Ann Nice, Withington, William Graham, Greenford, and Lewis Aubrey Wetherill, Harrow, England, assignors to Glaxo Laboratories Limited, Middlesex, England, a British company
No Drawing. Filed Feb. 26, 1963, Ser. No. 261,222
14 Claims. (Cl. 260—239.55)

This invention is concerned with improvements in or relating to the bromination of 12-keto sapogenins.

Various solvents have been proposed for use in the bromination of 12-keto sapogenins. Such solvents include, for example, halogenated hydrocarbons, such as chloroform, cyclic ethers, such as dioxan, or aromatic hydrocarbons, such as benzene. The use of such solvents, however, results in essence in concomitant bromination at the 11- and 23-positions. It is believed that bromine is first introduced at the 23-position and then immediately afterwards at the 11-position. However, the purpose of the bromination is to enable a function to be introduced at the 11-position and the bromine introduced at the 23-position is not only wasteful of bromine but requires a subsequent reaction to remove it and this generally results in loss of yield.

We have now found that by effecting the bromination in a solvent consisting essentially of a primary alkanol the bromination reaction appears to proceed by a quite different mechanism in which the bromine is introduced first at the 11-position and only to a small degree concomitantly at the 23-position. The reaction product obtained thus consists largely of 11-bromo-12-keto sapogenin with only a small proportion of 11,23-dibromo-12-keto sapogenin. Although the unwanted $C_{(23)}$ bromine has to be removed subsequently it is present to such a relatively small degree that it can be removed without much loss of yield.

A further and striking feature of the invention is that the $C_{(11)}$ bromine largely possesses the $\beta$-configuration so that if one wishes to dehydrobrominate the product this can be effected more readily than would be the case if the $C_{(11)}$ bromine were largely of the $\alpha$-configuration. It is to be noted that in conventional processes involving the 11,23-dibromination of 12-keto sapogenins the 11-bromine is almost entirely of the $\alpha$-configuration.

According to the invention, therefore, there is provided a process for the preparation of an 11-bromo-12-keto sapogenin or a 3-lower alkanoyl ester thereof, e.g. the acetate, which comprises subjecting a 12-keto sapogenin or ester thereof to the action of bromine under substantially anhydrous conditions in the presence of an added strong acid catalyst in a solvent consisting essentially of a primary alkanol containing up to 4 carbon atoms.

Primary alkanols which may be used include methanol, ethanol and industrial forms thereof e.g. industrial methylated spirit. However, it is particularly preferred to use methanol as the solvent especially when the 12-keto sapogenin is used in its unesterified form. Since the reaction must be performed under substantially anhydrous conditions, it is necessary to use a substantially anhydrous alkanol.

The 12-keto sapogenin or ester thereof need not be wholly in solution in the alkanol during bromination, i.e. it may be partly in suspension.

If one wishes to obtain an end-product which is a 3-ester of the sapogenin, particularly the acetate, it is desirable to use ethanol or industrial methylated spirits as the solvent since little alcoholysis of the 3-ester grouping takes place during bromination of the 12-keto sapogenin 3-ester in the presence of such a solvent. In methanol on the other hand, alcoholysis of the 3-ester does take place and the end-product is a mixture of 3-ester and 3-OH compounds; nevertheless satisfactory introduction of bromine takes place.

Methanol can be used with particular advantage as the solvent medium for the bromination of 12-keto sapogenins which are not esterified at the 3-position. With such sapogenins rapid up-take of bromine can be effected within 30 minutes. If the available starting material is the 12-keto sapogenin 3-ester this may conveniently be methanolysed in situ in methanol by the same strong acid catalyst as would be used for the bromination and the resultant 3-OH compound brominated in the methanol preferably after the addition of further strong acid catalyst. Where the bromination is preceded by alcoholysis of 12-keto sapogenin 3-ester the acid catalyst may be used in proportions of 1 to 12 equivalents.

The strong acid catalyst for the bromination reaction is preferably employed in an amount at least equivalent to the sapogenin to be brominated, suitable proportions being from 1 to 10 or even 12 equivalents of acid. The acid employed should of course be substantially anhydrous and otherwise substantially inert to the reactants under the reaction conditions employed. A suitable acid is hydrogen chloride.

The strong acid may be introduced into the reaction mixture in gaseous form or in the form of a solution in the primary alkanol used for the bromination.

Although hydrogen bromide is produced as a byproduct of the reaction it is necessary to add an initial amount of strong acid catalyst to initiate the reaction.

The bromination is conveniently effected at temperatures of from 10 to 30° C., preferably 18–25°. The preferred temperature may vary as between one alkanol and another and the preferred temperature should be ascertained by preliminary experiment as indicated below in respect of the amount of bromine to be used. A convenient method for carrying out the process according to the invention involves the addition of bromine at such a rate that there is no substantial amount of bromine present as judged by the colour of the reaction mixture. The bromine may be added, for example, as a solution in the alkanol to a solution or suspension of the steroid in the primary alkanol containing the strong acid catalyst. The bromine, however, is preferably added to the solution or suspension of the sapogenin in the primary alkanol as pure liquid bromine whilst vigorously stirring the solution or suspension. A further convenient method of introducing bromine to the solution or suspension of the steroid is to introduce it as bromine vapour carried in a stream of an inert gas, e.g. nitrogen.

Since primary alkanols react with bromine, it is necessary to employ an excess of bromine, the actual excess depending on the conditions employed. It has been found that about 1.1 moles of bromine to one mole of hecogenin in methanol is suitable when the bromine is added as liquid bromine whilst considerably more, e.g. about 1.6 moles of bromine per mole of hecogenin in ethanol, must be used if the bromine is added in solution in ethanol. It is undesirable to add the bromine as a solution in methanol due to the rapid reaction ensuing. The amount of bromine required in order to obtain optimum yield will thus depend on whether it is added in solution or not and the nature of the primary alkanol employed. The optimum amount of bromine required for a given set of circumstances may be ascertained by brominating the 12-keto sapogenin or ester with varying amounts of bromine and comparing the yields of the 9(11)-dehydro-12-keto sapogenin obtained on dehydrobromination of the product.

It will be appreciated that the bromination reaction is competitive as between the sapogenin and the alkanol but by careful choice of reaction conditions, the desired reaction can be effected in good yield.

The 11-monobromo-12-keto sapogenins and their esters obtained according to the invention are new compounds.

In order that the invention may be well understood the following examples are given by way of illustration only. In each of the examples the temperatures were measured in degrees centigrade.

Example 1

Hecogenin (30.0 g.) was stirred in suspension in absolute ethanol (600 ml.) and protected from direct sunlight. A 9.2 N solution of hydrogen chloride in absolute ethanol (18.4 ml.) was added, and then a solution of bromine (17.25 g.) in absolute ethanol (360 ml.) [prepared cold and allowed to warm to room temperature] was added dropwise over 160 min. After a further 10 min. the pale yellow solution was diluted with water (to ca. 12 litres) and the precipitated product (35.9 g.) (found: Br, 16.9%) was collected by filtration, washed with water, and dried at 50°/1 mm.

Repeated crystallisation from methanol gave 11β-bromohecogenin, M.P. 154–156°, $[\alpha]_D$ −37.3° (in $CHCl_3$), which analysed as a hydrate. (Found: C, 61.8; H, 8.15; Br, 14.8. $C_{27}H_{41}BrO_4 \cdot H_2O$ requires C, 61.5; H, 8.2; Br, 15.1%.)

Example 2

Hecogenin acetate (50 g.) was stirred for 16 hours at 35° C. in anhydrous methanol, 1225 mls., made 0.4 N with respect to hydrogen chloride. A sample then removed was shown by I.R. spectroscopy to be completely methanolysed to hecogenin.

The hydrogen chloride concentration was raised to 0.8 N and the temperature of the mixture was adjusted to 22° C. Liquid bromine (7.04 ml., 1.3 moles) was added at a uniform rate over 11 minutes. During the addition the suspended steroid dissolved to give a clear solution containing a slight excess of bromine. After a further 2 minutes the mixture was cooled by means of an external ice-bath and sodium bicarbonate (143 g.) was added carefully. Just enough 20% sodium metabisulphite was added to decolorise the excess bromine, and the product was precipitated by slow addition of water (2 litres) with the temperature of the mixture controlled below 10° C.

The product was collected by filtration, washed with water and dried, to give 11β-bromohecogenin, 54.60 g., $[\alpha]_D^{20}$ ($CHCl_3$) −35.4°.

Example 3

Finely ground hecogenin acetate (30.0 g.) was suspended with stirring in dried industrial methylated spirits (985 ml.) and a solution of hydrogen chloride in dried industrial methylated spirits (23.2 ml. of 8 N) was added. Bromine (4.25 ml., 1.3 moles) was added over 4½ hours in a nitrogen stream. The mixture was poured into water (10 litres) and the precipitated product filtered off, washed with water and dried in vacuo (40°) for 16 hours to give slightly impure 11β-bromohecogenin acetate (33.0 g., 94.5%), $[\alpha]_D$ −36.2° (c., 1 in $CHCl_3$). Found: Br, 13.9%. Calc. for $C_{29}H_{43}BrO_5$: Br, 14.5%. This material was dehydrobrominated using calcium carbonate in dimethylacetamide, as described by Carrington et al., J. Chem. Soc., 1961, p. 4567, to give essentially 9(11)-dehydro hecogenin acetate.

Example 4

To a stirred suspension of hecogenin acetate (50 g.) in methanol (1.175 litres), a solution of hydrogen chloride in methanol (44 ml. of 12.2 N, 5 moles) was added and the mixture stirred overnight. After the addition of a further 5 moles of hydrogen chloride in methanol, the mixture was stirred for 10 minutes and the reaction temperature then adjusted to 20°. Bromine (5.7 ml., 1.07 moles) was added to the stirred mixture over a period of 8 minutes, the maximum rate possible with discharge of the bromine colour. Sodium bicarbonate (143 g.) was added to the reaction mixture portionwise over a period of 10 minutes. The mixture was cooled to 10° and diluted by slow addition of water (2 litres) over 45 minutes. The precipitated material was collected by filtration, washed with water and dried in vacuo at 60° to give 11-bromohecogenin (53.65 g., 99.5%). Found: Br, 16.8%. $C_{27}H_{41}BrO_4$ requires Br, 15.7%. $[\alpha]_D$ −36.4° (c., 1 in $CHCl_3$).

This product, after dehydrobromination by the method given in the preceding example, gave $\Delta^{9(11)}$-dehydrohecogenin whose infra-red spectrum indicated the presence of only a trace of unconjugated carbonyl and of acetoxy groups. The residual bromine content amounted to 2.4%. U.V. absorption maximum at 237 m$\mu$, $$E_{1\,cm.}^{1\%} = 274$$

Example 5

Hecogenin acetate (30 g.) was suspended with stirring in methanol (750 ml.) and a 7.5 N solution of hydrogen chloride in absolute alcohol (47.6 ml.) added. Bromine (4.56 ml., 1.4 moles) was added in a stream of nitrogen to the reaction mixture over 4 hours. After diluting with water the bromo-compound was filtered off, washed and dried (40° in vacuo) to give a mixture of 11-bromohecogenin and 11-bromohecogenin acetate (33.52 g.), $[\alpha]_D$ −35° (c.=1, $CHCl_3$), Br=19.0%. Infra-red assay of the product showed the presence of ca. 20% of hecogenin acetate.

Although the invention has been specifically exemplified with respect to the use of hecogenin and hecogenin 3-acetate it will be appreciated that other 3-esters of hecogenin may be used and that other 12-keto sapogenins may be used. Hecogenin is a readily available 12-keto sapogenin but other known 12-keto sapogenins are not so readily available.

We claim:

1. A process for the monobromination at the 11-position of a compound selected from the group consisting of hecogenin and 3-lower alkanoyl esters thereof, comprising subjecting said compound to the action of bromine in the presence of an added strong acid catalyst in a reaction medium consisting essentially of a primary alkanol containing up to four carbon atoms.

2. A process as claimed in claim 1 in which said compound is hecogenin 3-acetate and said reaction medium consists essentially of ethanol.

3. A process as claimed in claim 1 in which said reaction medium consists essentially of methanol.

4. A process as claimed in claim 3 in which said compound is a 3-lower alkanoyl ester of hecogenin and the monobromination is preceded by methanolysis with a strong acid catalyst of said ester in the methanol.

5. A process as claimed in claim 1 in which said strong acid catalyst is employed in an amount at least equivalent to the starting compound.

6. A process as claimed in claim 5 in which said strong acid catalyst is employed in an amount of from 1 to 12 equivalents of strong acid per equivalent of starting compound.

7. A process as claimed in claim 1 in which said strong acid catalyst is hydrogen chloride.

8. A process as claimed in claim 1 in which monobromination is effected at a temperature of from 10–30° C.

9. A process as claimed in claim 8 in which monobromination is effected at 20–25° C.

10. A process as claimed in claim 1 in which monobromination is effected by the rapid addition of liquid bromine to said reaction medium in which the starting compound is at least partially dissolved.

11. A process for the monobromination at the 11-position of hecogenin, comprising rapidly adding at 20–25° C. liquid bromine to a reaction medium consisting essentially of methanol in which said hecogenin is at least partially dissolved in the presence of a hydrogen chloride catalyst and recovering 11β-bromohecogenin from said reaction mixture.

12. A compound selected from the group consisting of 11β-bromohecogenin and 3-lower alkanoyl esters thereof.

13. 11β-bromohecogenin.

14. 11β-bromohecogenin acetate.

References Cited by the Examiner

UNITED STATES PATENTS 2,899,428  8/59  Rothman et al. _____ 256—239.55
3,013,031  12/61  Cutler et al. _____ 260—397.45

FOREIGN PATENTS 759,596  10/56  Great Britain.

OTHER REFERENCES

Bowers et al.: "J. Chem. Soc." (1961), page 1860 relied on.

LEWIS GOTTS, *Primary Examiner.*